No. 840,894. PATENTED JAN. 8, 1907.
W. E. ALLINGTON.
BRANCH PIPE VALVE FOR DUST COLLECTING SYSTEMS.
APPLICATION FILED JULY 26, 1906.
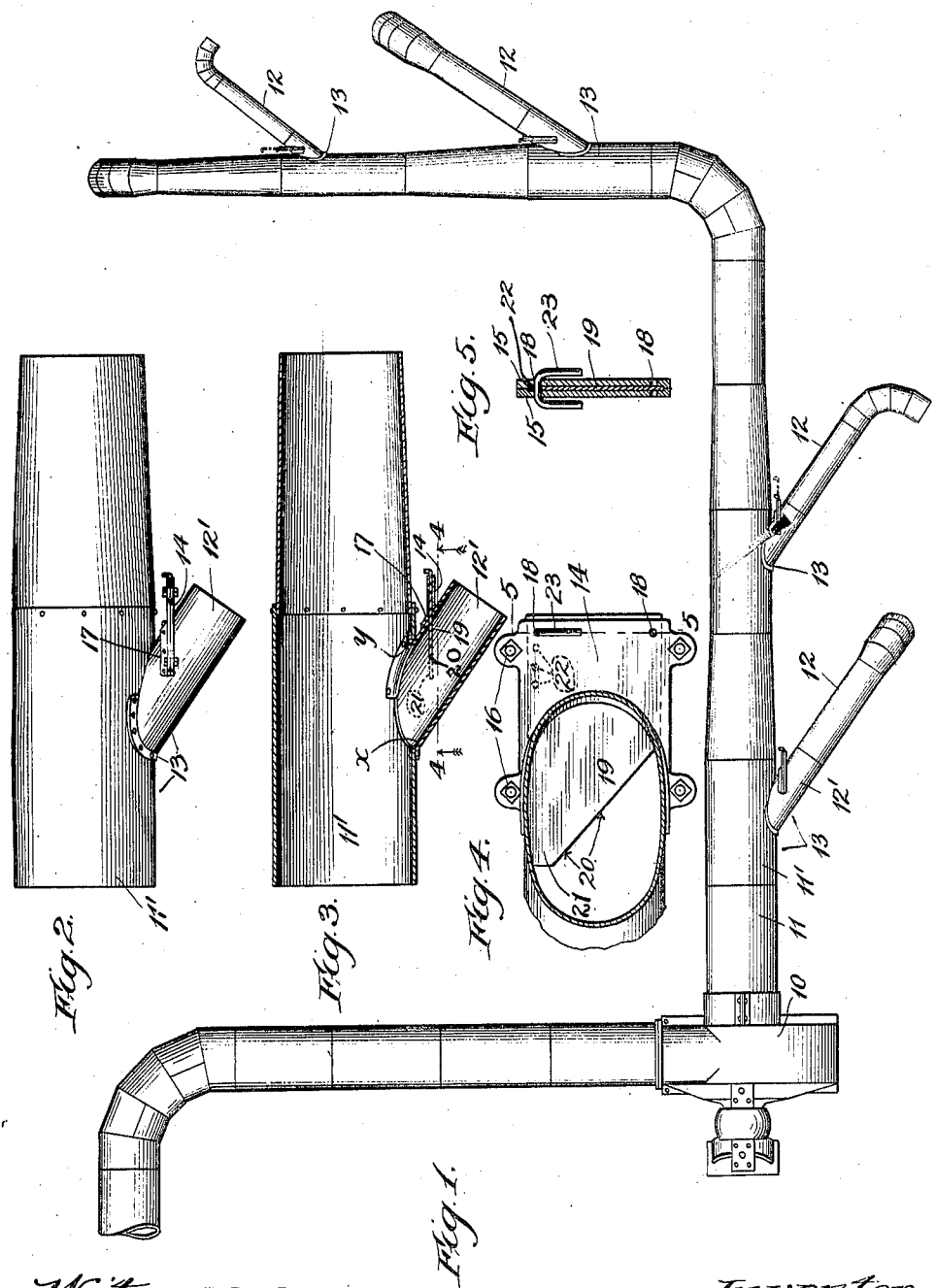

UNITED STATES PATENT OFFICE.

WILLIAM E. ALLINGTON, OF SAGINAW, MICHIGAN.

BRANCH-PIPE VALVE FOR DUST-COLLECTING SYSTEMS.

No. 840,894.     Specification of Letters Patent.     Patented Jan. 8, 1907.

Application filed July 26, 1906. Serial No. 327,803.

*To all whom it may concern:*

Be it known that I, WILLIAM E. ALLINGTON, a citizen of the United States, residing at Saginaw, in the county of Saginaw and State of Michigan, have invented certain new and useful Improvements in Branch-Pipe Valves for Dust-Collecting Systems, of which the following is a specification.

My invention relates to improvements in regulating-valves for dust-collecting systems, and has for its object to provide a valve for association with an angular joint for main and branch pipes which is susceptible of adjustment to most effectively and advantageously adjust the effective area of communication of the branch pipe with the main pipe for the purpose of varying at convenience the suction in a branch to a main suction-pipe.

In the drawings, Figure 1 illustrates a portion of a dust-collection blowpipe system shown in plan. Fig. 2 is an enlarged detail in plan of one of the valved pipe-joints. Fig. 3 is a transverse section in the plan of the joint of the structure shown in Fig. 2. Fig. 4 is a section on line 4 4 of Fig. 3. Fig. 5 is a section on line 5 of Fig. 4.

Throughout the drawings like numerals of reference refer always to like parts.

In the drawings, 10 indicates a fan, with the eye whereof communicates the main suction-pipe 11, to which extend at various points branch pipes 12 12. In accordance with the usual practice the area of the main suction-pipe 11 is at every point properly positioned in relation to the combined areas of the pipe and branches beyond it. The communication of each branch pipe 12 with the main suction-pipe 11 is effected at an acute angle.

Each joint structure, generally indicated as 13 on the drawings, comprises a section of piping 11', which constitutes part of the main suction-pipe 11, and the section 12', which constitutes part of the branch pipe 12, these two pipe-sections being connected together in any suitable manner for normally open communication.

For clear distinction I will hereinafter refer to that plane which is common to the axes of both the main and branch pipes at the joint as the "plane of the joint," and will refer to the parts of the joint respectively nearest to and most remote from the fan and marked $x$ and $y$ in Fig. 3 as respectively the "toe" and "heel" of the connection.

In the branch member 12' of the joint I provide a slide-valve, taking into the branch pipe from its heel side and preferably arranged in approximate parallelism to the main pipe, said slide being arranged at right angles to the plane of the joint and preferably having its forward end of such configuration as to reduce the effective area of the portion of the branch pipe above the plane of the joint to a greater extent than the reduction effected in the portion of the branch pipe below the plane of the joint.

Specifically, in the drawings 14 indicates a guide structure preferably comprising plates 15 of suitable length bolted together, as at 16, and shaped to provide an interior slideway throughout their vertical length, said structure 14 being suitably connected by rivets or otherwise, taking through a flange 17 of the guide to the heel side of the branch-pipe section 12' adjacent the heel $y$ of the joint. The guide structure 14 is preferably arranged in parallelism to the pipe-section 11', and its longitudinal guideway registers with a suitable slot in the branch-pipe member 12'. Through the side plates 15 of the guideway are made adjacent the top and bottom suitable apertures 18 for a purpose to be described.

The valve proper (indicated as 19) comprises a flat plate adapted to slide in the guideway provided by the structure 14 and through the aperture in the heel side of the branch pipe to regulate the effective or open area of said branch pipe at approximately its point of juncture with the main pipe. Preferably the front or first entrant edge of the valve 19 is cut away, as shown at 20, on an angle oblique to the plane of the joint, said slide being so arranged that its nose portion 21, of less width, enters the area of the branch pipe above the plane of the joint before the valve-plate begins to cut off the portion of the branch-pipe area below the plane of the joint. By this arrangement, it will be seen, the lower portion of the toe side of the joint is constantly maintained free or open, the cut-off action of the valve taking place wholly in the upper heel side of the branch pipe.

The valve-plate is provided with a series of apertures 22, positioned for successive registration with one of the apertures 18 in the guide for the reception of a staple 23 or any other suitable latching, locking, or sealing device for temporarily or permanently maintaining the valve member against movement in its guide. Thus when once properly positioned the valve may be secured in position against accidental movement.

In the operation of a dust-collecting system, such as is commonly installed in woodworking plants and the like, my improved valve plays a most important part in the question of economy or operation. In the installation of every such system the apportionment of the piping areas to result in the application of the necessary suction for the operation of different machines in different positions is always a nice one, and, furthermore, experience demonstrates that the suction requirement of machines commonly used in connection with dust-collector systems is apt to vary in considerable degree with the character of material handled and the like. The equipment of a system with valves, as herein shown, enables at any time a most effective adjustment of the effective areas of the different branch pipes to secure proper proportioning of the suction effect at the different points of material-supply.

It will be obvious that in any branch pipe, by moving the valve inward the effective area of the pipe is reduced, and consequently the suction exerted at the extremity of the pipe is reduced. Thus while a branch pipe of the capacity which is the maximum capacity ever required by a certain machine may be provided for such a machine, yet under normal working conditions when the demand of the machine may be lower than its maximum demand the proper adjustment of the valve in the piping-branch to reduce the suction to the desired point prevents wasteful expenditure of energy now ordinarily suffered in creating in said branch pipe at all times the maximum suction effect which may ever be required.

The construction of valve herein shown, which operates upon the upper heel side of the branch pipe, I have found to be most advantageous, as I have empirically discovered that the material inflow through the pipe tends always to travel out of the branch pipe into a main pipe, along the lower toe side of the branch pipe, so that the arrangement herein shown cuts down the effective pipe area without interfering with the flow of material.

It will further be apparent that the arrangement shown positions the side of the valve proper toward which the material flows at an obtuse angle relative to the axis of the branch pipe, which further insures that the material will not find lodgment against the valve.

While I have herein described in detail a valve structure which I have found in practice to be efficient, it will be apparent that many changes might be made in the specific construction without departure from the spirit and scope of my invention.

Having thus described my invention, what I claim, and desire to secure by Letters Patent of the United States, is—

1. In combination with an angular joint for main and branch pipes, in a dust-collecting system, a slide-valve for the branch pipe taking thereinto from the heel side of the branch pipe.

2. In combination with an angular joint of main and branch pipes, in a dust-collecting system, of a slide-valve for the branch pipe taking thereinto from the heel side of the branch pipe at an obtuse angle to the inner surface of the heel side of said pipe.

3. The combination with a piping-joint comprising a main-pipe part and a branch-pipe part communicating therewith at an acute angle, of a slide-valve entering the branch pipe from its heel side, and at its end shaped to enter the area of the branch pipe above the plane of the joint before it enters the area of said branch pipe below the plane of the joint.

4. The combination with a piping-joint comprising a main-pipe part and a branch-pipe part communicating therewith at an acute angle, of a slide-valve having an inclined end.

5. The combination with a piping-joint comprising a main-pipe part and a branch-pipe part communicating therewith at an acute angle, of a slide-valve entering the branch pipe from its heel side, and means for retaining the valve in adjusted position.

In testimony whereof I hereunto set my hand in the presence of two witnesses.

WILLIAM E. ALLINGTON.

In presence of—
   GEO. T. MAY, Jr.,
   MARY F. ALLEN.